United States Patent [19]
Wilcox

[11] 3,751,971
[45] Aug. 14, 1973

[54] AIR GAGING DEVICE

[76] Inventor: John C. Wilcox, c/o P.A. Patterson Co., Inc., 2201 Ardmore Ave., Drexel Hill, Pa. 19027

[22] Filed: Oct. 20, 1971

[21] Appl. No.: 190,798

[52] U.S. Cl. ................................ 73/37.9, 73/209
[51] Int. Cl. ........................................ G01m 3/02
[58] Field of Search ....................... 73/37.9, 37.5

[56] References Cited
UNITED STATES PATENTS

| | | | |
|---|---|---|---|
| 3,443,417 | 5/1969 | Meyer, Jr. | 73/37.9 |
| 2,963,901 | 12/1960 | Aller | 73/37.5 |
| 3,066,530 | 12/1962 | Stenberg | 73/209 X |
| 3,603,148 | 9/1971 | Ributa | 73/209 |
| 2,593,957 | 4/1952 | Aller | 73/37.9 |
| 3,074,264 | 1/1963 | Polk | 73/37.5 |

Primary Examiner—Richard C. Queisser
Assistant Examiner—Daniel M. Yasich
Attorney—Zachary T. Wobensmith, 2nd

[57] ABSTRACT

An air gaging device is provided wherein a regulated flow of air is provided to and through a visual gaging device, which includes a transparent hollow tube supporting a rotormeter tube and providing a pathway for air flow to a workpiece whose dimensions are to be measured.

5 Claims, 6 Drawing Figures

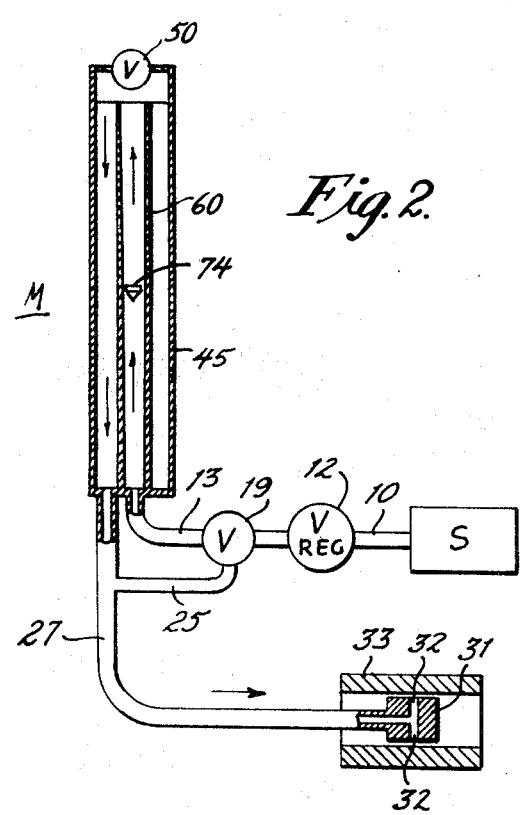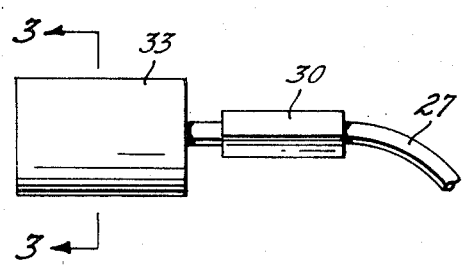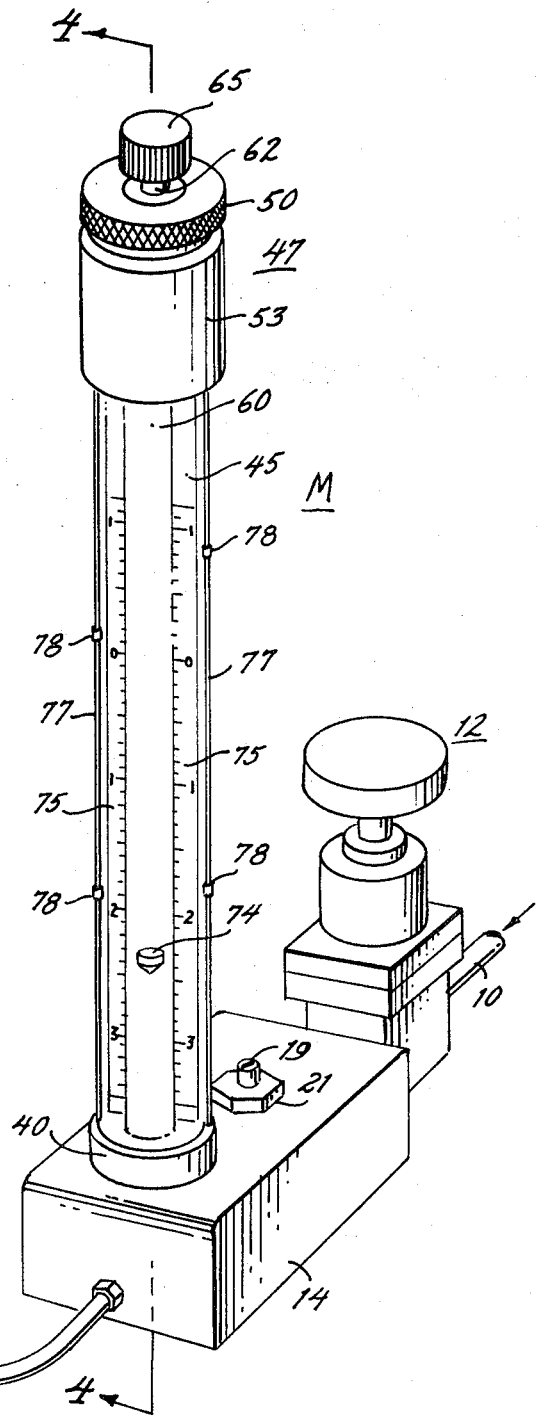

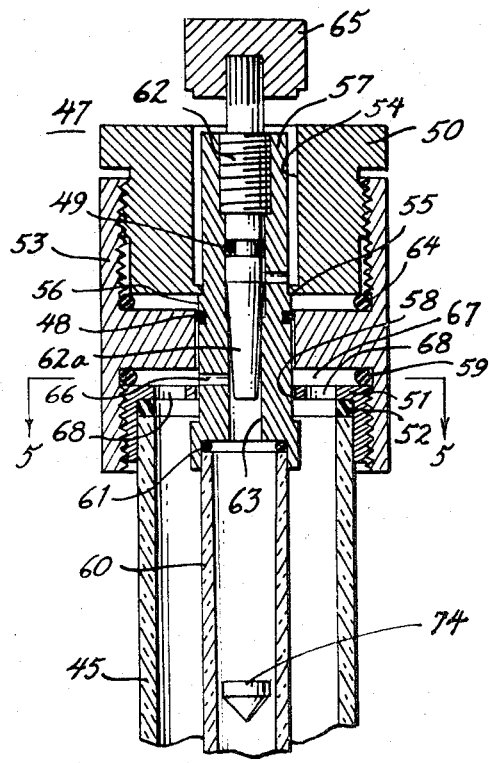
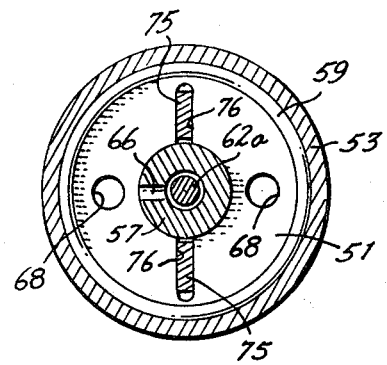
Fig. 5.
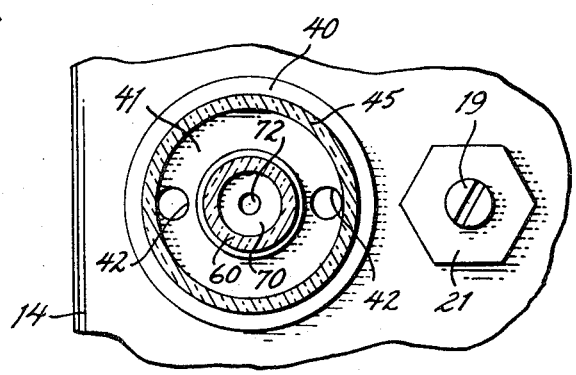
Fig. 6.
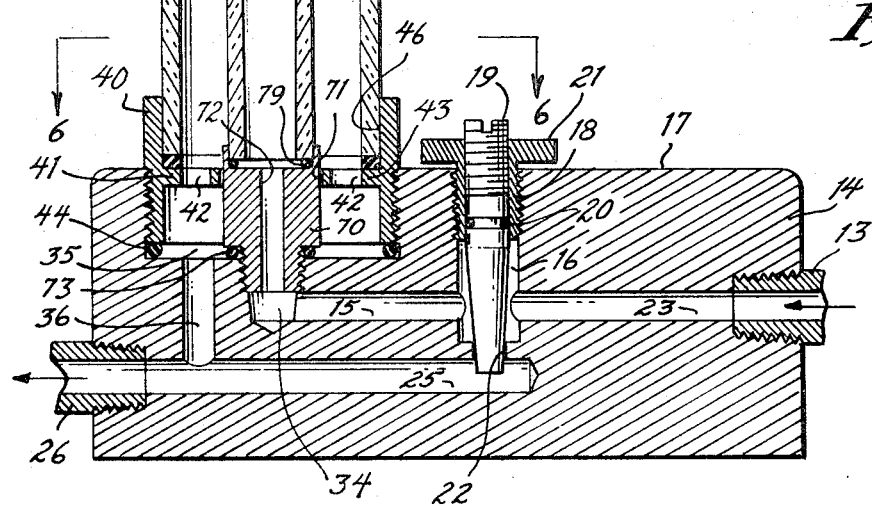
Fig. 4.
INVENTOR.
JOHN C. WILCOX
ATTORNEY.

AIR GAGING DEVICE

BACKGROUND OF THE INVENTION

1. Field of the Invention

This invention relates to an air gage which measures the leakage flow of fluid at a workpiece to measure the workpiece dimensions.

2. Description of the Prior Art

Leakage gaging devices for measuring the leakage flow of fluid past a workpiece are common. Most such devices include a supply of air under pressure, a regulator and a flow measuring instrument connected to the regulator such as an internally tapered tube with a float in it. The output of air from the tube is directed to a gaging head insertable in a workpiece to be measured and the difference between the float height in the tube before and after the introduction of the workpiece is measured and checked by comparison with the float heights obtained by standard workpieces.

These devices are inaccurate, require constant careful adjustment, lack sufficient support for the tube and are of unattractive appearance. The apparatus of the invention does not have the defects of prior designs and has many advantages.

SUMMARY OF THE INVENTION

An air gage is provided in which a regulated air supply flow which passes through a flow meter tube and into an outer transparent tube supporting the flow meter tube which outer tube provides an air flow path to the workpiece whose dimensions are to be measured.

The principal object of the invention is to provide an air gaging device which accurately measures the air flow past a work piece.

A further object of the invention is to provide an air gaging device which requires little maintenance but may be readily cleaned.

A further object of the invention is to provide an air gaging device which is simple to construct but reliable in operation.

Other objects and advantageous features will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is a perspective view of the air gaging device in accordance with the invention;

FIG. 2 is a diagrammatic view of the apparatus of FIG. 1;

FIG. 3 is a vertical sectional view taken approximately on the line 3—3 of FIG. 1;

FIG. 4 is a vertical sectional view, enlarged, taken approximately on the line 4—4 of FIG. 1;

FIG. 5 is a horizontal sectional view taken approximately on the line 5—5 of FIG. 4, and FIG. 6 is a horizontal sectional view taken approximately on the line 6—6 of FIG. 4.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings the air gaging device includes a line 10 connected to a supply S of filtered air under pressure and connected to a pressure regulator valve 12 of well known type with a pipe 13 connected thereto and in threaded engagement in the base 14 of a tube assembly M. The base 14 is fabricated of metal, is of rectangular shape and has a passageway 23 with which the pipe 12 is in communication.

A passageway 16 is provided of larger diameter than passageway 15 and perpendicular to passageway 15 in intersecting relation. The passageway 16 extends to the top surface 17 of base 14 and has a valve body 18 in threaded engagement therein. The valve body 18 has a valve stem 19 therein, with a tapered lower end 23, and with an O-ring 20 around the stem 19 between it and the valve body and an adjustment handle 21 attached to stem 19. The passageway 16 has a complemental tapered seat 22 for the valve stem end 19 in intersecting relation to and communicating with a passageway 25. The passageway 25 extends to the left as seen in FIG. 4 and has a connector bushing 26 of a hose 27 in threaded engagement therewith. The hose 27 has a connector sleeve 30 attached to its end opposite to bushing 26 and is detachably connected to a gaging head 31. The gaging head 31 can be of any desired type with opposed passageways 32 and which is shown in FIG. 2 with a master gage or a workpiece 33 therearound whose internal dimensions are to be measured.

The passageway 15 extends to the left as shown in FIG. 4 and is intersected by passageway 34 which is perpendicular to passageway 15 and of larger diameter. The passageway 34 extends upwardly and terminates at a larger passageway 35. The passageway 35 is in axial alignment with the bore 34 and extends to the top surface 17 of the base 14.

A passageway 36 connects the passageway 35 to the passageway 25.

The passageway 35 has a sleeve 40 in threaded engagement therein which sleeve 40 extends upwardly above the surface 17 and has a centrally located disk 41 therein with two holes 42 therethrough. The disk 41 provides a shoulder 43. A sealing ring 44, such as an O-ring, is seated against shoulder 43 with an outer tube 45 engaged therewith and supported by the inner surface 46 of sleeve 40.

The tube 45 can be of any suitable lightweight transparent material with hardened glass being particularly suitable.

The tube 45 has a cap and clean out valve assembly 47 thereon which includes a cap 51 detachably secured thereto and having a sealing ring 52 interposed therebetween. An outer sleeve 53 is in threaded engagement with the cap 51 and has a removable plug 50 in threaded engagement therein. The plug 50 has a hollow bore 54 and an internal shoulder 55 which engages the rim 56 of a vent screw body 57. The body 57 extends down through an opening 58 in cap 51 and encloses the end of an internally tapered flowmeter or rotameter tube 60. A sealing ring 48 prevents fluid leakage between the sleeve 53 and the valve body 57.

A sealing ring 61 is interposed between the valve body 57 and the tube 60, and a sealing ring 59, such as an O-ring, is interposed between cap 51 and sleeve 53.

The body 57 has a vent screw 62 in threaded engagement therein with a tapered seating portion 62a engaging in a complemental interior portion of the body 57. A sealing ring 49 prevents fluid leakage along the body of the vent screw 62. An operating handle 65 is carried on the outer end of the screw 62. A sealing ring 64 is provided between the sleeve 53 and the plug 50.

The body 57 has a radial hole 66 connecting to the bore 63 and to a space 67 between the cap 51 and the outer sleeve 53. Holes 68 in cap 51 permit communication from the space 67 to the interior of the tube 45.

The tube 60 is carried at its lower end in a plug 70 which extends through a hole 71 in disk 41 and is in threaded engagement in the passageway 34. A central opening 72 is provided in plug 70 connecting with passageway 34 and tube 60. A sealing ring 79 is interposed between the lower end of the tube 60 and the plug 70 to prevent fluid leakage. A sealing ring 73 such as an O-ring is provided between the plug 70 and the base 14.

A float 74 of conventional type is provided in the tube 60 and floats therein at a height dependent on the air flow through the tube 60. A pair of plates 75 are provided carried in tube 45 and with indicia thereon for measuring the height of the float 74 in tube 60. The plates 75 are secured at the top in grooves 76 in cap 51 and at the bottom extend into similar grooves in disk 41 at spaced locations 90 degrees from the holes 42. A pair of wires 77 may be provided with slidable limit stops 78 thereon. The wires 77 are attached to sleeve 53 at the top and sleeve 40 at the bottom. The stops 78 may be located along the wires to set limits for float height which are acceptable for the workpiece dimensions.

The mode of operation will now be pointed out.

Air is supplied from source S through line 10 to regulator 12 which maintains a constant pressure. The air from regulator 12 flows into passageway 15 past valve stem 19 which is closed to prevent air from entering passageway 25 and the air flows through opening 72 and into tube 60. The float 74 is urged upward until it reaches a height dependent on the rate of air flow. The air passes through tube 60, bore 63 and hole 66 into space 67. The air flows from space 67 through holes 68 into tube 45, then through holes 42 into passageway 36, then through passageway 25 into base 27 and to gaging head 31. Having established the float 74 height for a workpiece 33 of acceptable dimensions, limit stops 78 can be set to indicate acceptable limits of variation. A workpiece 33 to be checked is placed on gaging head 31 and the height of the float 74 is observed. The cycle is repeated for successive workpieces with adjustment of regulator 12 to compensate for different workpieces.

The vent screw 62 can be removed, when desired, for cleaning by delivery of a larger air flow upwardly through the tube 60 into which a cleaning wire or brush can also be inserted with the screw 62 removed. The valve stem 19 can be positioned for direct delivery of air to passageway 25 upwardly through the tube 45, the holes 68, hole 66 and bore 63 to atmosphere for cleaning by its turbulence. The structure may also readily be dismantled for cleaning including washing of the tubes 45 and 60.

I claim:

1. An air gaging device for connection to a source of air under pressure and to a gaging member which comprises
    a base,
    a transparent flow meter tube carried by said base with its lower and inlet end in sealed relation to the base and having an upper delivery end,
    float means variably positioned in said flow meter tube dependent on the flow in said tube,
    an outer transparent tube in surrounding relation to said flow meter tube and carried by said base with its lower and discharge end in sealed relation to the base and having an upper inlet end,
    cap means supported by said tubes and having portions in sealed engagement with the upper ends of said tubes,
    said cap means having fluid passageways therein connecting the interiors of said tubes for delivery of air from the interior of the flow meter tube to the interior of the outer tube,
    said cap means having a removable member providing access to said passageways and to the interior of said flow tube for cleaning purposes,
    a fluid supply connection in said base in communication with the lower end of said flow meter tube, and
    a fluid delivery connection in said base in communication with the lower end of said outer tube and the air gaging member.

2. An air gaging device as defined in claim 1 in which scale members are provided between the exterior of the flow meter tube and the interior of said outer tube, and
    said scale members are carried at their upper ends in said cap means.

3. An air gaging device as defined in claim 2 in whcih adjustable indicator means are provided exteriorly of said outer tube for positioning along said scale members.

4. An air gaging device as defined in claim 1 in which said base has a valve therein for bypassing said flow meter tube.

5. An air gaging device as defined in claim 1 in which said cap means also includes a valve body carried thereby, and
    said valve body has said member removably mounted therein.

* * * * *